3,564,027
NOVEL 1-METHYL-OESTRENE COMPOUNDS
Carel Christoff Bolt, Oss, Netherlands, assignor to Organon Inc., West Orange, N.J., a corporation of New Jersey
No Drawing. Filed Oct. 12, 1967, Ser. No. 674,731
Claims priority, application Netherlands, Oct. 22, 1966, 6615005
Int. Cl C07c 169/08
U.S. Cl. 260—397.5                1 Claim

ABSTRACT OF THE DISCLOSURE

The present invention relates to novel $\Delta^4$-1$\alpha$-methyl-17$\beta$-hydroxy-17$\alpha$-saturated or unsaturated alkyl-oestrene compounds.

These compounds exert strong anabolic, androgenic, oestrogenic, progestational and ovulation inhibiting activities.

---

This invention relates to novel 1-methyl-oestrene compounds and to a process for the preparation thereof.

More particularly, this invention relates to novel 1$\alpha$-methyl-oestrene compounds of the formula:

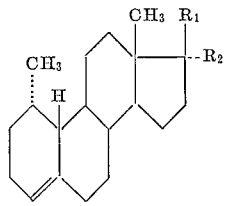

wherein $R_1$=OH or OAcyl, and
$R_2$=a saturated or unsaturated alkyl with 1–4 carbon atoms.

These novel compounds are prepared by starting from the corresponding $\Delta^4$-1$\alpha$-methyl-17-keto-oestrene and introducing the saturated or unsaturated alkyl group in 17-position by an alkylation reaction after which the thus obtained 17$\beta$-hydroxy-17$\alpha$-alkyl-oestrene compounds may be esterified at the 17-hydroxyl group.

The alkylation in 17-position can be performed by adding a metal derivative of a saturated or unsaturated hydrocarbon to the 17-keto group of the relative compound. The metal derivative may be a Grignard compound, e.g., the magnesium bromide of the relative hydrocarbon or an alkyl lithium compound. A specific method for the preparation of the 17-hydroxy-17-alkynyl compounds consists in that the 17-keto-steroid is reacted with a triple unsaturated hydrocarbon in the presence of an alkali metal or an alkali metal compound, such as an alkali metal amide or alkali metal alcoholate, or by the addition of a metal compound of a triple unsaturated hydrocarbon, such as an alkali metal or alkaline earth metal compound, to the 17-keto group of the starting product. As equivalent to the processes described above, must be regarded the method for the preparation of the desired 17-hydroxy-17$\alpha$-alkyl or alkenyl compounds in which first the 17-hydroxy-17$\alpha$-alkyl or alkenyl compounds in which first the 17-alkenyl compound by an addition reaction, after which this compound is converted into the corresponding 17-alkenyl or 17-alkyl compound by reduction, for instance, by means of hydrogen in the presence of a catalyst, such as nickel or Pd/BaSO$_4$. This route is mostly more favourable than the method in which the addition takes place at once, because the addition reaction with a metal derivative of a triple unsaturated hydrocarbon usually gives a better yield than the addition reaction with an alkane or alkene metal derivative.

The hydrocarbon radical possibly present in the final products in 17-position may be, e.g., a methyl, ethyl, propyl, butyl, isopropyl, vinyl, propenyl, allyl, methallyl, ethynyl, propynyl, propargyl or butynyl radical.

The secondary or tertiary 17-hydroxy-steroids prepared by the processes described above may be esterified, if desired. In the esterification inorganic acids, such as phosphoric acids, or saturated or unsaturated organic carboxylic acids with 1–18 carbon atoms may be applied.

The preparation of these esters may take place by any method known per se by reaction of the 17-hydroxy steroid with the relative acid or the anhydride or halide thereof.

As examples of organic carboxylic acids to be used in the esterification are mentioned: formic acid, acetic acid, propionic acid, butyric acid, valeric acid, caproic acid, caprylic acid, capric acid, undecylic acid, lauric acid, tridecylic acid, myristic acid, pentadecylic acid, oleic acid, palmitic acid, stearic acid, arachic acid, trimethyl acetic acid, diethyl acetic acid, hexahydrobenzoic acid, cyclopentyl propionic acid, cyclohexyl butyric acid, cyclohexyl propionic acid, citronellic acid, undecylenic acid, benzoic acid, phenyl acetic acid, phenyl propionic acid, phenyl butyric acid, phenyl propiolic acid, adamantane carboxylic acid, malonic acid, succinic acid, glutaric acid, pimelic acid and tartaric acid.

The compounds according to the invention are important on account of their anabolic, androgenic, oestrogenic, progestative and ovulation-inhibiting properties.

The compounds according to the invention may be administered parenterally or orally in the form of suspensions, solutions, emulsions or solid pharmaceutical dosage unit forms, usually after mixing with auxiliaries or, if desired, other active components.

The invention is further illustrated by the following examples:

PREPARATION OF STARTING PRODUCT

Crude 1-methyl-19-nor-testosterone (24.7 gm.) obtained by reduction of 1-methyl-oestradiol-3-methylether by the Birch method, is dissolved in 80 ml. of pyridine and 25 ml. of acetic anhydride. The mixture is stored for 63 hours at 4° C. and then poured into ice water. The precipitate is sucked off, washed until neutral, dried and chromatographed over silicagel. By elution with a 5% ether/benzene mixture 22.01 gm. of solid substance is obtained, from which after crystallisation from diisopropylether and from diisopropylether/hexane 10 gm. of $\Delta^4$-3-keto-1$\alpha$-methyl-17$\beta$ - acetoxy - oestrene is obtained. Melting point 153–153.5° C.; [$\alpha$]$_D$=38° (CHCl$_3$).

Saponification of this compound yields the $\Delta^4$-3-keto-1$\alpha$-methyl-17$\beta$-hydroxy-oestrene with a melting point of 208–209° C. and [$\alpha$]$_D$=+57° (CHCl$_3$).

To a solution of 5 gm. of $\Delta^4$-3-keto-1$\alpha$-methyl-17$\beta$-acetoxy-oestrene in 100 ml. of methanol are added 3.5 ml. of ethane dithiol and 2.5 ml. of BF$_3$-etherate. The mixture is stirred at room temperature for 3 hours and then poured into 500 ml. of a 10% NaOH solution in water. By extraction with methylene dichloride, washing of the extract with a 10% NaOH solution and then with water until neutral, drying on sodium sulphate, and filtration, a filtrate is obtained, which is evaporated to dryness in vacuo. The residue is chromatographed over silicagel with a mixture of hexane and benzene (2:8) as eluent. Two grams of the resulting $\Delta^4$-3-keto-1$\alpha$-methyl-17$\beta$-acetoxy-oestrene-3-ethylene dithioketal, dissolved in 20 ml. of tetrahydrofuran, are added dropwise to a suspension of 1 gm. of sodium in 60 ml. of liquid ammonia, after which the mixture is stirred for 15 minutes at —40° C. Then 6 ml. of ethanol are added, whereupon the ammonia is evaporated and water is added. By extraction with methylene dichloride, washing of the extract with a dilute NaOH solution and with water until neutral, followed by evaporation to dryness a crude product is obtained, which after chromatography over silicagel (eluent benzene/ether (95:5)) yields the Δ⁴-1α-methyl-17β-hydroxy-oestrene. Melting point 115–116.5° C.; [α]_D=+104° (CHCl₃).

To a solution of 5.8 gm. of Δ⁴-1α-methyl-17β-hydroxy-oestrene in 550 ml. of acetone are added dropwise while stirring at −10° C. 10.5 ml. of a Jones reagent, whereupon the mixture is stirred at the same temperature for 15 minutes, after which methanol is added and the reaction mixture is poured into 3 l. of water. By extraction with methylene dichloride, washing of the extract with water, drying on sodium sulphate, filtration and evaporation of the filtrate to dryness, a crude product is obtained, which after crystallization from methanol yields Δ⁴-1α-methyl-17-keto-oestrene. Melting point 106–108° C. and [α]_D=+197° (CHCl₃).

EXAMPLE I

Potassium (1.5 gm.) is dissolved in 9 ml. of isopropanol and 27 ml. of benzene, after which acetylene is bubbled through the solution for 1 hour at room temperature and for 3 hours at 0° C. Then a solution of 2.4 gm. of Δ⁴-1α-methyl-17-keto-oestrene in 13 ml. of benzene and 9 ml. of ether are added, after which acetylene gas is bubbled through the mixture at room temperature for 16 hours. After cooling to 0° C. dilute sulphuric acid is added and the mixture poured into water. By extraction with ether, washing of the extract with a sodium bicarbonate solution and with water until neutral, drying and filtration, followed by evaporation of the extract to dryness and chromatography over silicagel with hexane/benzene (2:3) the Δ⁴-1α-methyl-17β-hydroxy-17α-ethynyl-oestrene is obtained. Melting point 81–83° C. and [α]_D=+128° (CHCl₃).

By an addition reaction of Δ⁴-1α-methyl-17-keto-oestrene with successively methyl magnesium bromide, allyl magnesium bromide, propynyl magnesium bromide, butyl magnesium chloride, and butenyl magnesium bromide the corresponding 17β-hydroxy-17α-alkyl derivatives have been obtained.

Esterification of these compounds yields the corresponding 17-esters derived from acetic acid, oenanthic acid, phenylpropionic acid, palmitic acid, capric acid and succinic acid.

EXAMPLE II

To a mixture of 400 gm. of 5% Pd/BaSO₄ in 4 ml. of ethyl acetate, which has first been hydrated, a solution is added of 1.94 gm. of Δ⁴-1α-methyl-17β-hydroxy-17α-ethynyl-oestrene in 40 ml. of ethyl acetate. This mixture is shaken in hydrogen atmosphere till 95% of the calculated quantity of hydrogen has been taken up. Then the catalyst is removed by filtration. The filtrate is evaporated to dryness and the residue chromatographed over silicagel/silver nitrate (hexane/benzene 1:1) to obtain the Δ⁴-1α-methyl-17β-hydroxy-17α-ethyl-oestrene. Melting point 74–77° C. and [α]_D=+70° (CHCl₃).

If hydration is stopped after one-half of the quantity of hydrogen stated above has been taken up the corresponding 17β-hydroxy-17α-vinyl compound is obtained.

By esterification of the above-mentioned compounds the corresponding 17-esters are obtained derived from acetic acid, butyric acid, trimethyl acetic acid, caprylic acid, palmitic acid and phenylpropionic acd.

EXAMPLE III

To a soluton of 8.5 g. of Δ⁴-1α-methyl-17-keto-oestrene in 100 ml. of benzene under nitrogen was added a solution of isopropyllithium in pentane. The mixture was refluxed for 1 hour, filtered over hyflo, and the filtrate was washed neutral with water, dried and evaporated in vacuo, yielding 9.2 g. of an oil. The crude oil was treated in 250 ml. of ethanol and 20 ml. of acetic acid with 14.0 g. of Girard P in the usual manner, yielding 5.6 g. of a crude product which was chromatographed over 14.0 g. of silicagel, and crystallized four times from methanol, giving 1.7 g. of pure Δ⁴-1α-methyl-17β-hydroxy-17α-isopropyl-oestrene.

I claim:
1. 1α-methyl-oestrene compounds of the formula:

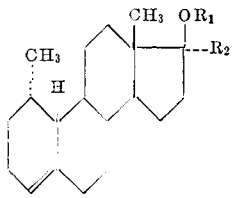

wherein

R₁ is selected from the group consisting of hydrogen and acyl derived from a member selected from the group consisting of a phosphoric acid and an organic carboxylic acid having 1 to 18 carbon atoms, and R₂ is alkyl having 1–4 carbon atoms.

References Cited

UNITED STATES PATENTS 3,112,328   11/1963   Szpilfogel et al. ____ 260—397.3
3,324,152   6/1967   Müller et al. _____ 260—397.5

FOREIGN PATENTS 624,988   8/1961   Canada _____ 260—397.5

LEWIS GOTTS, Primary Examiner

E. G. LOVE, Assistant Examiner

U.S. Cl. X.R.

260—239.5, 397.3, 397.4, 999